United States Patent [19]

Hollis, Jr. et al.

[11] Patent Number: 5,146,566
[45] Date of Patent: Sep. 8, 1992

[54] INPUT/OUTPUT SYSTEM FOR COMPUTER USE INTERFACE USING MAGNETIC LEVITATION

[75] Inventors: Ralph L. Hollis, Jr., Yorktown Heights, N.Y.; Septimiu E. Salcudean, Vancouver, Canada

[73] Assignee: IBM Corporation, Armonk, N.Y.

[21] Appl. No.: 707,549

[22] Filed: May 29, 1991

[51] Int. Cl.$^5$ .............................................. G06F 3/033
[52] U.S. Cl. .................................... 395/275; 335/220; 364/190
[58] Field of Search ................ 364/927.6, 167.01, 188, 364/190; 395/155, 275; 318/568.21; 273/DIG. 28; 335/220, 266; 901/29, 30, 38

[56] References Cited

U.S. PATENT DOCUMENTS

| | | |
|---|---|---|
| 4,216,467 | 8/1980 | Colston . |
| 4,369,663 | 1/1983 | Venturello et al. . |
| 4,536,746 | 8/1985 | Gobeli . |
| 4,639,668 | 1/1987 | Petit et al. . |
| 4,825,157 | 4/1989 | Mikan . |
| 4,839,838 | 4/1989 | LaBiche et al. . |
| 4,874,998 | 10/1989 | Hollis, Jr. . |
| 4,879,556 | 11/1989 | Duimel . |
| 5,099,216 | 3/1992 | Pelrine ............................. 335/220 |

OTHER PUBLICATIONS

Input Technologies Extend The Scope Of User Involvement; Computer Design, Mar. 1, 1988.
"Using A Manipulator For Force Display In Molecular Docking", University of North Carolina, 1988, Ming Ouh-young et al.
"Making Nested Rotations Convenient For The User", University of North Carolina, Britton et al., Aug. 1978.
"A Six Degree-of-Freedom Magnetically Levitated Variable Compliance Fine Motion Wrist", Hollis et al., Aug. 1987.
"Input Device Taxonomy", University of North Carolina, James S. Lipscomb and Michael E. Pique, 1986.
"Creating An Illusion of Feel: Control Issues In Force Display", University of North Carolina, Ming Ouh-young et al., Sep., 1989.
"Toward a Tele-Nanorobotic Manipulation System with Atomic Scale Force Feedback and Motion Resolution", R. L. Hollis et al., 3rd IEEE Workshop on Micro Electro Mechanical Systems, Feb. 1990.
"Telltale Gestures", Paul McAvinney, BYTE, Jul., 1990, pp. 237-240.
"Getting A Feel For Atoms", Ivan Amato, Science News, Apr. 7, 1990, vol. 137, No. 14, pp. 216-220.

Primary Examiner—Robert L. Richardson
Attorney, Agent, or Firm—Sterne, Kessler, Goldstein & Fox

[57] ABSTRACT

A programmable computer user input/output (I/O) system having a multiple degree-of-freedom magnetic levitation (maglev) device with a matched electrodynamically levitated flotor and stator combination and an electrodynamic forcer means for receiving coil currents for applying controlled magnetic forces mutual to the flotor and stator. A sensing means measures the relative position and orientation of the flotor and stator. The I/O system includes a maglev I/O device control software module for measuring the relative movement of the flotor-stator combination of the maglev device and for controlling the coil currents provided to the electrodynamic forcer means. At least one active device model module, comprising a software representation of a mechanical I/O device, controls the maglev I/O device control software module to generate signals which emulate the mechanical I/O device represented by the active device model. An application software module contains code instructions representing predetermined information relevant to that application and understandable to the user of the application software. An application binding software module is interposed and operatively coupled between the maglev I/O device control software module and the application software module for controlling at least one of a) the application software module as a function of the measured sensing means output, and b) the maglev I/O device control software module as a function of the predetermined application software information.

10 Claims, 4 Drawing Sheets

INPUT/OUTPUT SYSTEM FOR COMPUTER USER INTERFACE USING MAGNETIC LEVITATION

TECHNICAL FIELD

This invention relates to computer user interface techniques. More particularly, the invention relates to input/output devices and methods. Still more particularly, the invention relates to a programmable I/O device and method using active moving coil magnetic levitation.

BACKGROUND ART

The continual performance improvements of computer systems has led to a number of complex applications (modelling for mechanical and electrical design, simulation, large data-base search, etc.) that require significant computer-user interaction. It is clear that the lack of efficiency of this interaction creates a bottleneck that limits productivity. The heavy use of graphics, menus and "point-and-pick" devices such as the mouse and the digitizing tablet have helped speed-up many applications and attract new users that would be intimidated by lengthy panel selection and complicated commands.

From simple traversing of a menu tree to three-dimensional geometric modelers, computer interfaces can be improved by using more sophisticated, ergonomically designed mechanical input devices with several degrees of freedom and with some degree of programmability. See, for example, T. Williams, "Input Technologies Extend The Scope Of User Involvement", *Computer Design* (March, 1988). Two relevant examples are the Felix input device, from Lightgate Corp., Emeryville, Calif. and the Spaceball input device, from Spatial Systems, Milsons Point, NSW, Australia.

The Felix input device has a handle that can slide about on a 1 in$^2$ surface that maps the entire display area for absolute X-Y positioning. The edges of the handle's motion range correspond to the display margins. Two of these edges contain "hot-spots" or "corners" that can be felt by the user. The edges and hot-spots correspond to range correspond to the display margins. Two of these edges contain "hot-spots" or "corners" that can be felt by the user. The edges and hot-spots correspond to kinesthetically stable places that, by appropriate programming, can be made to correspond to frequently used menu commands or macros. Users of the Felix device could operate it without lifting their hands off the desk.

The Spaceball input device is a spongy knob, the size of a tennis ball, attached to a six degree-of-freedom force-torque sensor. According to its developers, the Spaceball's novelty is its programmability, that is, the ability to switch off a translation or rotation axis by software control. This allows for isometric device emulation (for example, "rate-control" mouse emulation, by allowing only inputs that correspond to translational motion in the plane) and is useful in solid modelers for constrained rigid body motion.

Mechanical devices equipped with actuators can also act as output devices that provide kinesthetic feedback to the user. However, there are difficulties with designing and building multi-degree-of-freedom, actuated, back-driveable, I/O devices. Indeed, when more than three degrees of freedom are required, such I/O devices begin to look very much like conventional robots, that is, serial kinematic linkages with several actuated moving parts. They are plagued by the same problems—anisotropic and high inertias, friction and low-bandwidth frequency response. Force-reflecting input-output device design has been a long-standing problem in the area of teleoperation of robotic devices—a survey can be found in Vertut et al., *Robot Technology*, 3A: Teleoperations and Robotics: Evolution and Development, Prentice-Hall Series on Robot Technology, Prentice-Hall (1986).

A fairly complete classification of input devices from a computer scientist's point of view can be found in Ouhyoung et al., "Using A Manipulator For Force Display In Molecular Docking", *Proc. IEEE Robotics and Automation Conf.* 3:1824–1829 (1988). A good compilation of user "wish-lists" and devices designed to cope with them can be found in T. Williams, "Input Technologies Extend The Scope Of User Involvement", *Computer Design* (March, 1988).

Recently, a new technology was invented which provides a key component for a new general purpose computer input device: a novel robot fine motion "wrist" having six degrees of freedom over a limited motion range ($\pm 4$ mm translation, $\pm 5°$ rotation from a nominal center position). This technology is described in commonly assigned U.S. Pat. No. 4,874,998, issued Oct. 17, 1989 to R. L. Hollis. The wrist has a single moving part called a "flotor" that is actively levitated by the parallel action of multiple electrodynamic (moving coil) actuators. The translational and rotational offsets between the wrist's magnetically levitated (maglev) flotor and its support (referred to as the "stator") are obtained by means of an optical sensing system and are used in a feedback law to control the actuators. The feedback or control law is implemented on a dedicated microprocessor. By altering its software parameters, the stiffness of the wrist's flotor for translations along or rotations about arbitrary axes can be varied by program control, allowing it to emulate various mechanisms, such as linear or planar sliders and gimbals. Laboratory tests of the "feel" of the mechanisms emulated or "synthesized" have been very successful, due to the low mass of the flotor, its high-bandwidth frequency response (tracking bandwidth of over 35 Hz for translation and 15 Hz for rotation), and the lack of any friction. The robot fine motion wrist is further discussed in the Hollis '998 patent and in Hollis et al., *Robotics Research* 4:65–73, MIT Press.

The following I/O device characteristics have been found to be desirable:
- good ergonomic design
- the availability of kinesthetically stable locations for menu selection and frequently used commands
- the ability to switch the device from absolute to relative positioning
- the ability to move intuitively in three-dimensional space
- the ability to select and turn off axes
- several actuated degrees of freedom to provide kinesthetic feedback by force and "stiffness" control for multiple parameter adjustment and rigid body motion in a force field or with constraints (for molecular "docking", geometric modelling, flight simulation).

No single computer input device known to the inventors, either in the literature or in the marketplace, currently satisfies this set of conditions.

The present invention was developed with a view toward providing the above-listed desirable characteristics in an I/O computer interface device. As will be described in detail below, this invention combines existing technologies in a new way to create a computer interface I/O device that is capable of emulating a variety of known mechanical I/O devices.

The present invention overcomes the deficiencies and problems associated with the conventional technology and achieves the desired characteristics of an I/O device described above.

FEATURES AND ADVANTAGES OF THE INVENTION

The present invention affords several features and advantages over known user interface I/O devices, among which are the following:

The I/O device of this invention has the ability to emulate a multitude of known mechanical I/O devices.

By the use of appropriate programming, the I/O device of this invention can serially emulate two or more mechanical devices within a single application.

The I/O device of this invention permits the user to adjust, through programming modifications, the feel of the emulated mechanical device to suit the user's needs.

The I/O device of this invention is interactive, in that the feel of the emulated mechanical device can be modified by the application program to provide a device "feel" that is controlled by the application program and is representative of the action being simulated by the program.

The operation of the I/O device of this invention is a function almost entirely of the controlling software. The device is essentially free of mechanical influence.

DISCLOSURE OF THE INVENTION

The present invention is directed to a programmable I/O system for computer users. The I/O system includes a multiple degree-of-freedom magnetic levitation (maglev) device having a matched electrodynamically levitated flotor (manipulated by the user) and stator combination and an electrodynamic forcer means for receiving coil currents for applying controlled magnetic forces mutual to the flotor and stator. The I/O system includes a maglev I/O device control software module for measuring the relative movement of the flotor-stator combination of the maglev device and for controlling the amplitude and direction of the coil currents provided to the electrodynamic forcer means. At least one active device model module, comprising a software representation of a mechanical I/O device, controls the maglev I/O device control software module to emulate the mechanical I/O device represented by the active device model. An application software module, adapted to run on a host computer, contains code instructions representing predetermined information relevant to that application and understandable to the user of the application software. An application binding software module is interposed and operatively coupled between the maglev I/O device control software module and the application software module for controlling at least one of a) the application software module as a function of the measured relative movement of the flotor-stator combination, and b) the maglev I/O device control software module as a function of the predetermined application software information.

BRIEF DESCRIPTION OF THE DRAWINGS

The foregoing and other features and advantages of the invention will be apparent from the following more particular description of preferred embodiments of the invention, as illustrated in the accompanying drawings.

BEST MODE FOR CARRYING OUT THE INVENTION

The technology of active moving-coil magnetic levitation, with its programmable stiffness or compliance, its ability to synthesize mechanisms, to apply accurate forces and to quickly track desired translational and rotational offsets, led to the development of the present invention, namely a new general-purpose I/O device for computer-user interfaces. This invention incorporates a new application of the maglev technology, as well as a new computer-user interface system which combine existing components and associated algorithms and software in a novel way.

The principles of the maglev device used in the preferred embodiment of this invention is fully described in Hollis, U.S. Pat. No. 4,874,998. The disclosure of the Hollis '998 patent is incorporated by reference herein in its entirety as though set forth in full below. For convenience, however, the maglev device is described briefly below with particular reference to FIGS. 1-4.

MAGLEV DEVICE

In a preferred embodiment of this invention, the programmable magnetic levitation input/output system employs a six-degree of freedom ("DOF") magnetic levitation ("maglev") device. It is noted in passing that it may also be possible to use a known type of electromagnetic magnetic bearing device, which has a mass of magnetic material floating in a field created by surrounding magnets. It is not clear, however, that a magnetic bearing would work as well as the maglev device used in the preferred embodiment of this invention.

The maglev device used in preferred embodiments contemplated by the present invention features a single moving part, a dynamically levitated movable "flotor" element. The flotor unit is the levitated structure; it bears the same relationship to the fixed structure (stator) as does the more commonly known rotor in a magnetic bearing, hence "flotor." The relative roles of flotor and stator as moving and fixed elements, respectively, may be exchanged, but for clarity the coil-bearing element will be designated the flotor in this text.

HEXAGONAL FLOTOR

Figure 1:
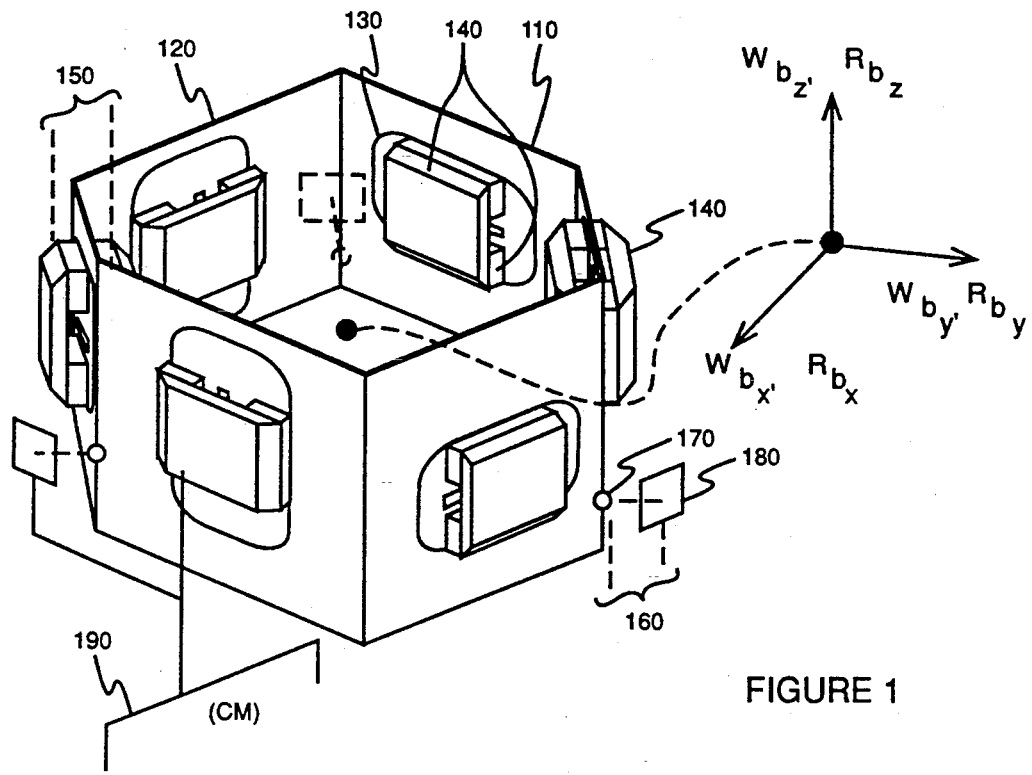
FIG. 1 is a diagram of a hexagonal maglev device used in an embodiment of this invention, with associated coordinate system, in the neutral position.
Figure 2:
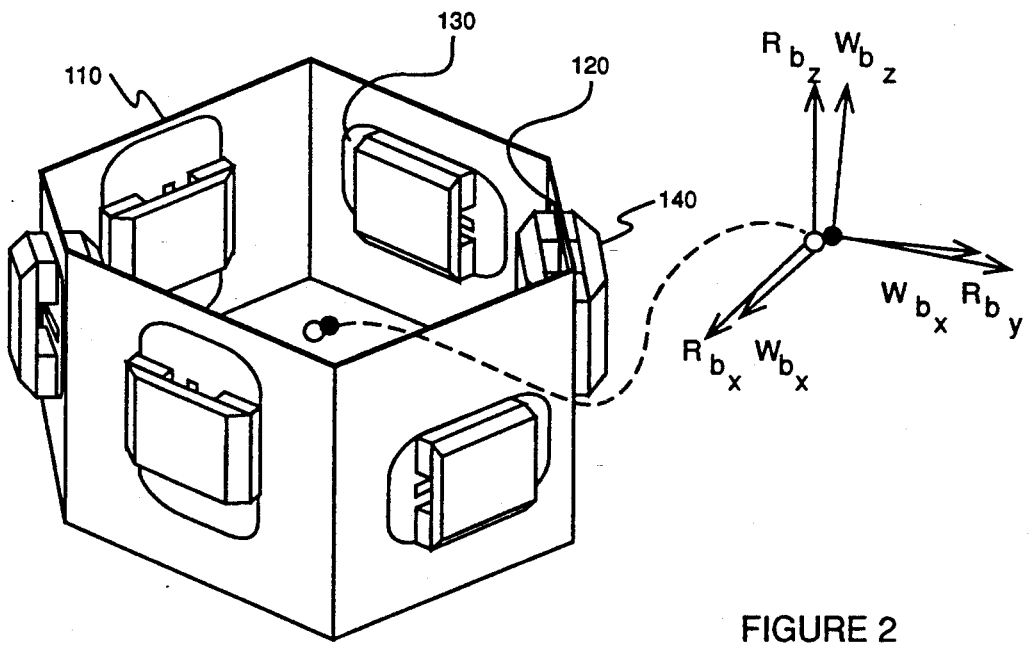
FIG. 2 shows the maglev device of FIG. 1 in a translated and rotated position, with associated coordinate frames.

FIG. 1 shows a flotor unit 110 which is in the form of a prism of hexagonal cross-section. A hollow rigid moving flotor shell 120 contains planar or quasi-planar curved magnetic flotor coils 130. The flotor unit 110 cooperates with an associated stator assembly 410 (shown diagrammatically in FIG. 4).

Each flotor coil 130 interacts with a respective stator magnet assembly 140 mounted on the stator assembly 410. Together each flotor and stator coil combination comprises an integrated "forcer" element 150. The combined interaction of all the forcer elements 150 in a controlled manner produces the desired motion of the flotor unit 110. In the preferred embodiment, a flexible ribbon cable provides electrical connections to the coils 130 without restricting motion of the flotor 110. There are six forcer elements in FIG. 1, shown in two interspersed orthogonally situated triads. That is, adjacent forcer elements are oriented at right angles to each other around the hexagonal flotor unit 110. The flotor coils 130 operate within large magnetic gaps in the fixed stator structure 410 containing permanent magnets 140. Relative position sensing devices described below sense changes in the relative positions of the flotor and stator. Control means to be described below control flotor coil currents to produce a fine motion device capable of moving with high translational and rotational accelerations over distances and angles limited by the magnetic gaps. The forcer elements 150 are arranged in such a manner as to provide three orthogonal translational degrees of freedom and three rotational degrees of freedom developed by coil currents specified by the control unit of this invention. As shown in FIG. 1, the six forcer elements 150 are not arranged identically, but rather are rotated 90° from their adjacent forcers. In the preferred embodiment, they are alternately horizontal and vertical. These may be parallel to the top surface of flotor unit 110 as shown in FIG Alternatively, they may be at +45°, −45°, +45°, relative to the top surface, or otherwise to accomplish the same purpose. Essentially, any combination of current-carrying coils interacting with appropriate fixed magnetic fields which allows a general force-torque vector to be exerted on the flotor will suffice. The hollow moving shell flotor unit 120 is suspended by actively controlled magnetic levitation in such a manner that the compliance (stiffness) can be varied over a wide range of magnitudes and directions under the program control of this invention.

PERIPLANAR COIL

The flotor unit 110 has a periplanar coil 130 (planar to match the rectangular face of flotor unit 110 with hexagonal periphery, or curved to match a different flotor unit configuration with curved periphery). For six degrees of freedom, a number (at least six) of flat-wound periplanar (flat or curved) flotor coils 130, operating in magnetic fields produced by permanent magnet assemblies are required to produce actuation forces and torques in three dimensions. The periplanar coils 130 are rigidly incorporated in the lightweight hollow shell 120 which comprises the moving part of the maglev device. Alternatively, for some applications, the magnets 140 and associated structures can be made to move, with the flotor unit 110 structure fixed, an arrangement which has some advantages for cooling. The position and orientation of the flotor relative to the stator is measured by sensors 160. These sensors comprise light emitting diodes 170 arrayed about flotor unit 110. The light is sensed by lateral effect cells 180 on the stator support unit 190, which is mounted to a fixed base 190 as shown schematically by an earth mark in FIG. 1. Lateral effect cells or position-sensing photodiodes are commercially available, for example, from United Detector Technology, Inc. Power for the light emitting diodes 170 is provided by the same flexible cable used for the coils 130. The sensors 160 provide flotor unit 110 position data feedback for control of the maglev device in real time in a manner described in more detail below. The sensors that can be used are not limited to the lateral effect cells disclosed. They can comprise any suitable device that senses the relative positions of the flotor and stator.

FORCER ELEMENT

The basic electromechanical unit which provides a source of force or (in pairs) torque to the maglev device is a periplanar (flat and curved) coil electrodynamic drive unit, or forcer element.

Figure 3:
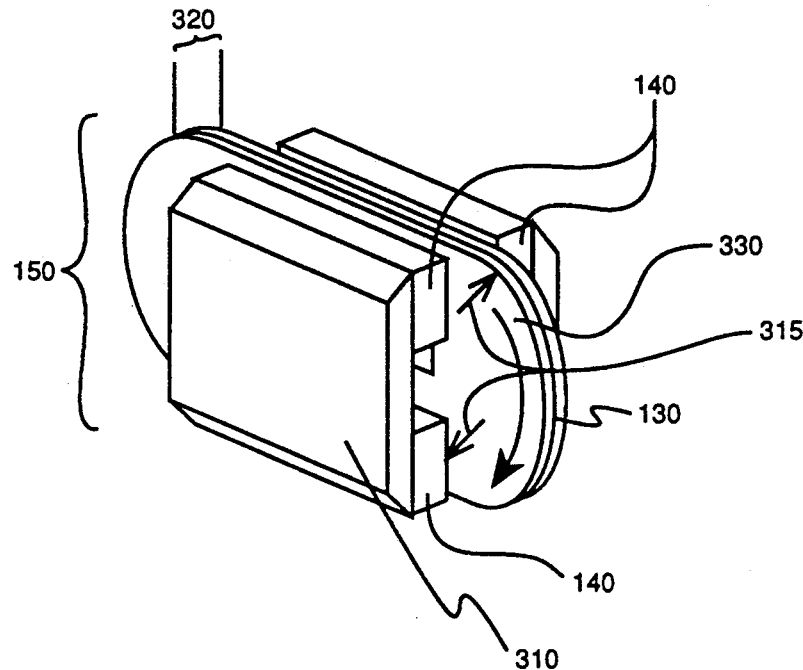
FIG. 3 is a diagram of one forcer unit used in the maglev device of FIG. 1.

FIG. 3 shows a typical forcer element 150. Four permanent magnets 140 with two permeable return plates 310 provide high fields (arrows 315) in the large gap 320. Current in the periplanar coil 130 interacts with the field to produce a force mutually orthogonal to the field and current directions. A pair of permeable return plates 310 serve to return the flux The periplanar coils 130 are wound from flat copper wire with high temperature epoxy insulations. Current in flotor coil 130 interacts with the field to produce a force $F=BiL$, where B is the magnetic flux density or field produced by the fixed magnet, i is the current in the wire, and L is the effective length of wire in the magnetic gap 320.

For efficiency in motive force and torque, the gap should be minimized. However, the size of the gap determines the extent of translational and rotational motion. In practice, a compromise must be struck, but the gap will always be greater than the minimum gap needed for electrodynamic efficiency.

FLOTOR LEVITATION

Figure 4:
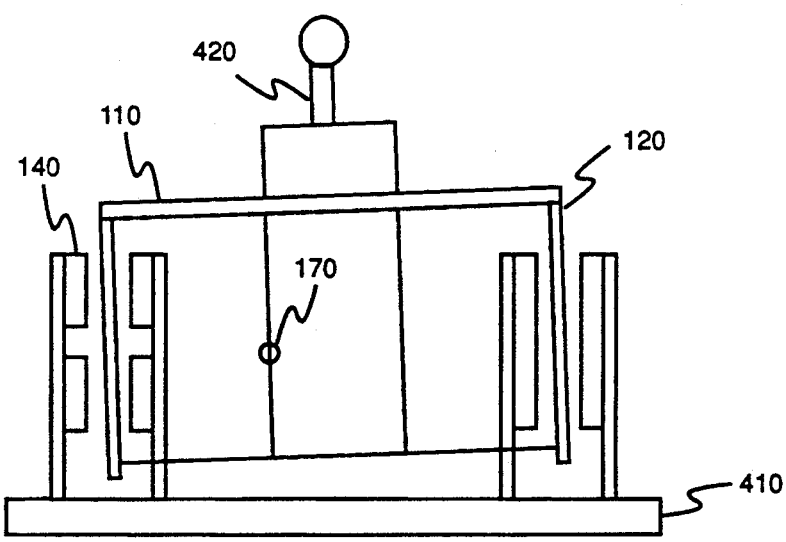
FIG. 4 is a semidiagrammatic view through the maglev device of FIG. 1.

FIG. 4 is an elevation semidiagrammatic section view of the maglev device, showing flotor unit 110 mounting the periplanar coils 130 (not shown in FIG. 4) on the flotor shell 120 in juxtaposition with forcer magnets 140 mounted on the stator 410. Flotor unit 110 is levitated; that is, it is suspended in space by virtue of magnetic forces. The flotor unit 110 carries a base or stem 420 for a handle adapted to be grasped by the computer user. Referring back to FIG. 1, position and orientation are monitored by sensors 160.

I/O HARDWARE and SOFTWARE

Figure 5:
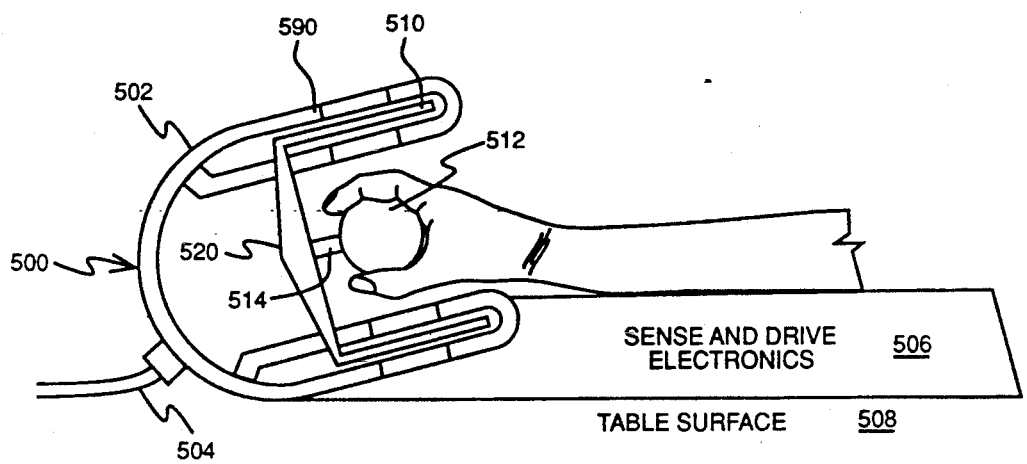
FIG. 5 shows an implementation of the general purpose maglev input/output device of a preferred embodiment of the invention.
Figure 6:
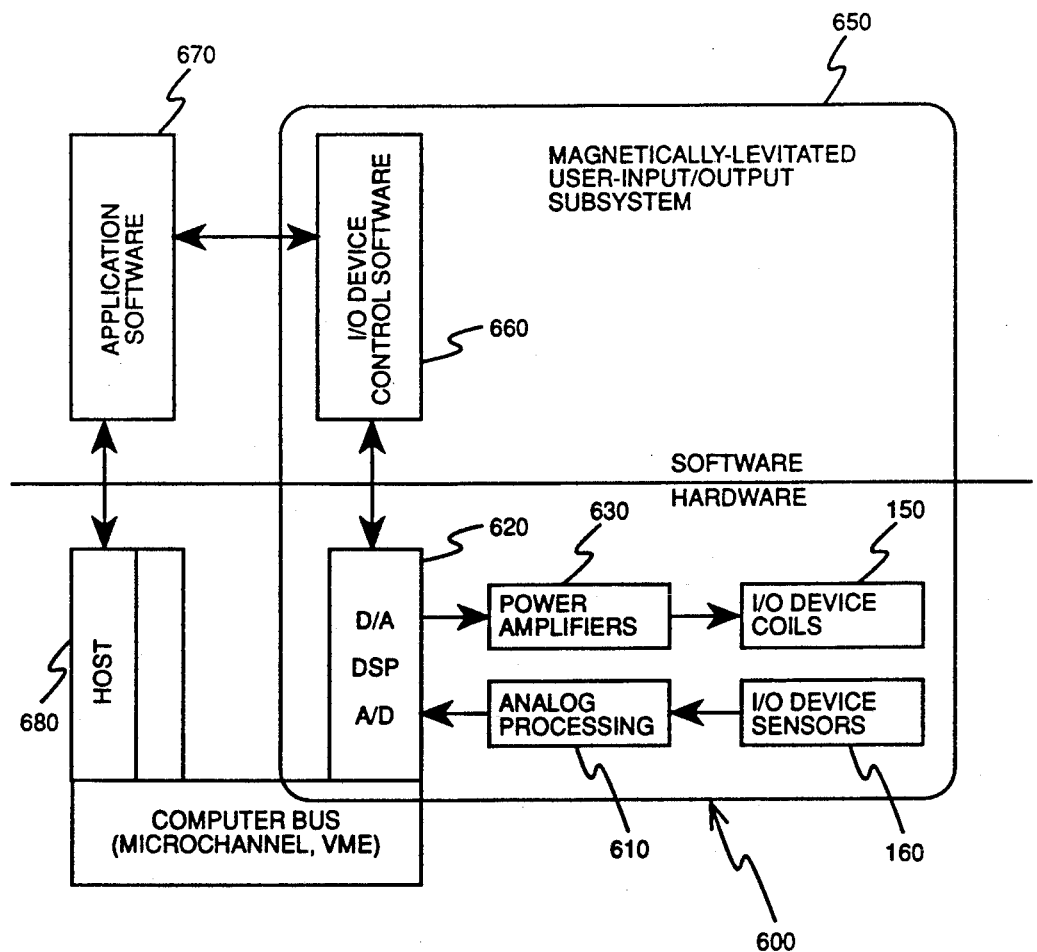
FIG. 6 is a system block diagram showing the active maglev user input/output subsystem as a plug-in addition to a general purpose computer system.
Figure 7:
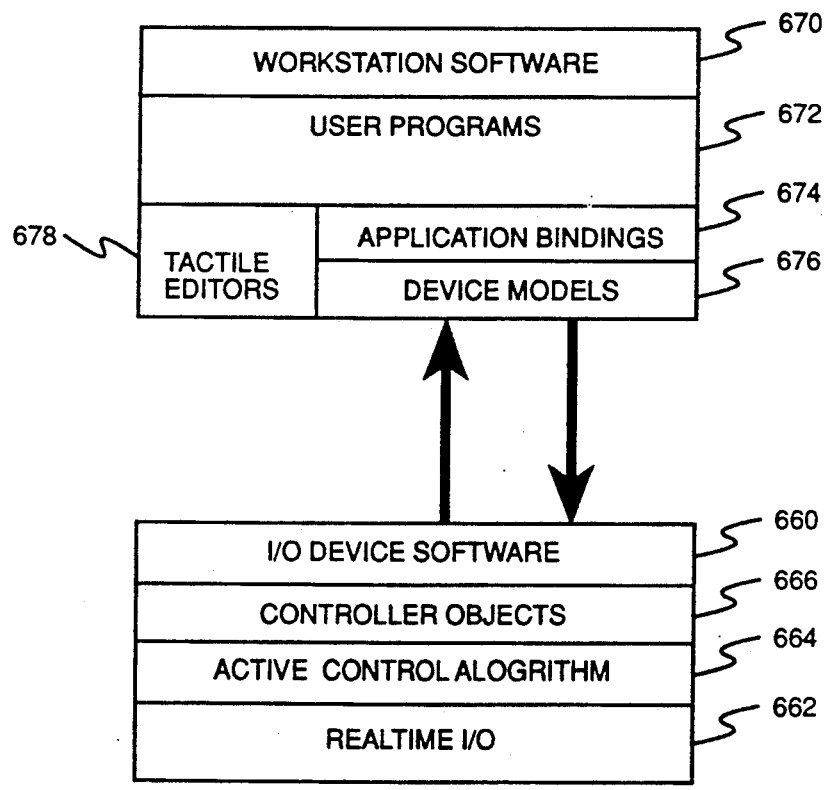
FIG. 7 is a block diagram of the software organization of a preferred embodiment of the invention.

The I/O system of this invention incorporating the maglev device described above is shown in detail in FIGS. 5–7. FIG. 5 shows the user operated portion of the hardware. FIGS. 6–7 show the computer hardware and software elements which operate and are operated on by the maglev device. There are several ways in which the software could be organized to give the user the desired functionality. One possible approach is discussed below. In this embodiment, the user application software runs on the host machine (which can be a uni- or multi-processor), and the I/O device control software runs on a DSP (digital signal processor) or a DSP-like ASIC (application specific integrated circuit).

A wide range of possible geometries can be used to implement the moving-coil magnetic levitation I/O device. In one preferred embodiment, at least six coils and sensor inputs are used in any convenient arrangement. This allows an arbitrary force/torque vector to be exerted. Motion ranges of the order of ±10 mm and ±10° should be straightforward and are considered adequate for a wide range of possible applications.

Referring first to FIG. 5, a maglev device is shown generally at 500. The device 500 includes an outer housing 502 incorporating a stator 590 and a flotor 510. In the preferred embodiment of the invention, the maglev device 500 corresponds to the maglev device shown in FIGS. 1-4, but could be spherical in design to maximize the usable range of translational and rotational motion. The maglev device 500 communicates with its associated computer in a known manner through leads 504. In the embodiment shown, the device 500 rests at the end of a housing 506 and sits at an angle which is ergonomically designed to be comfortable for the user. The housing 506 contains the sensing and driving electronics for the maglev device, as is more fully described below.

In one version, the entire unit is intended to sit on a computer table, generally designated 508, like an ordinary joystick or a mouse, adjacent to the display. In another configuration, the maglev device 500 could be built directly into the housing of the workstation and the sensing and driving electronics could be incorporated onto one or more cards that plug directly into spare slots in the workstation.

Depending on the motion range of the flotor 510, its desired forces and torques, and depending on the noise level in the system, it may be possible to integrate part or all of the above components into one or two boards that can plug into the host computer bus (IBM Microchannel, VME, etc.).

In the embodiment shown, a handle 512, preferably in the shape of a ball, is fixed through a stem 514 to the housing shell 520 of flotor 510. As will be apparent to one skilled in the relevant art, the handle 512 could take any desirable shape, such as a joystick, wheel, T-bar, etc., or any other shape that is comfortably graspable by the user. The handle could also be miniaturized so that it could be operated by one or more fingers (and thus incorporated, for example into a laptop or notebook sized portable computer). It can also incorporate switches or other active devices, such as mouse buttons, or the like.

As shown in FIG. 6, the I/O system of the invention incorporates both hardware and software elements. The hardware elements, generally designated 600, include the I/O device sensors 160, an analog processor 610, a D/A, A/D digital signal processor (DSP) 620, power amplifiers 630, and the I/O device coils 130. As described above, the sensors 160 detect the relative position and orientation of the flotor-stator combination and generate an analog voltage signal representative of the detected position and orientation coordinates. These signals are processed in the analog processor 610, in a manner well known to those skilled in the relevant art. In the herein described preferred embodiment of a six DOF maglev device, there are six sets of sensors 160 which provide six separate inputs to the analog processor 610 (or three pairs of two-axis sensors, as indicated in FIG. 1, or any other suitable combination of sensors). The processed analog signals are then converted to digital signals by the D/A converter portion of the digital signal processor 620, for further processing by the DSP 620 and the I/O device control software, as described in more detail below.

Following operations on the processed digital signals in the DSP 620, the digital signals are then converted back to analog signals by the D/A converter portion of DSP 620. The analog output signals are amplified in power amplifiers 630 and applied to the I/O device coils. Again, in the herein described preferred embodiment of a six DOF maglev device, there are six separate signals which are amplified in power amps 630 (which could, for example, be linear or pulse width modulated amplifiers) and are applied separately to the coils 130 of the six separate forcer elements 150. More specifically, the output signals from amplifiers 630 are applied in the form of coil currents to flotor coils 130 of the electrodynamic forcer 150. The coil currents interact with fixed magnetic fields in stator magnets 140 (also called Lorentz actuators, as they use the Lorentz force of the current interacting with a magnetic field to produce the desired forces). This produces controlled magnetic forces mutual to the flotor and stator. These forces are analogous to a number of synthetic springs, each having a predefined zero-point and stiffness value. By controlling the coil currents in sets applied to the forcer elements over the entire range of mutual motion to control both zero-point and stiffness value, control of the relative orientation and compliance of the stator and flotor combination can be achieved.

The software elements, generally designated 650 in FIG. 6, include I/O device control software 660 and workstation software 670, both shown in more detail in FIG. 7. The I/O device control software 660 runs in the DSP 620. The device control software controls the overall operation of the maglev device. The control operation is described in detail in the Hollis '998 patent, with specific reference to Col. 9, line 25–Col. 10, line 63. This software runs at high speed to achieve good performance.

Referring to FIG. 7, the I/O control software includes realtime I/O commands 662, active control algorithms 664 and controller objects 666. The realtime I/O are low level commands, at the hardware level, for reading the A/D converted signals and writing out to the D/A converter. The active control algorithms are the functions which make the maglev device simulate a joystick, slider, mouse, etc. They control the gains of the signals that are to be applied to the maglev device coils. This is analogous to a servosystem. For example, stiffness may be represented by a 6×6 matrix. By changing the coefficients of the matrix elements, the gain of signals applied to the forcer coils is changed to make the maglev device feel more like a particular mechanical device. The active control algorithms 664 are described in more detail in Hollis, R. L., et al, "A Six Degree-of-Freedom Magnetically Levitated Variable Compliance Motion Wrist," Robotics Research, Vol. 4, MIT Press, the disclosure of which is incorporated herein by reference. In the system of this invention, only one control algorithm is operative at a time. Thus, the maglev device feels to the user either like a joystick, or a slider, or a mouse, etc.

The controller objects 666 consist of a library of virtual devices, containing the programs and data necessary to simulate various mechanical user interface devices. A given controller object set is typically called up by the application program which is running at the time. Alternatively, the controller object set may be user-selected, for example, by clicking on a screen icon representing the mechanical device (joystick, slider, mouse, etc.).

The specific behavior of the maglev device is controlled by the workstation software 670. The workstation software includes the application or user programs 672, and application bindings 674; it may also include device models 676 and tactile editors 678. The workstation software resides on a host computer 680. The host may be a stand alone or networked workstation, or it may be a remote computer, such as a mini or mainframe. The application software 672 may consist of any known program, such as a flight simulator, a crane control simulator, a CAD program, word processing program, etc. that contains user interface software.

A CAD program, for example, may contain default instructions to select the control object set for a mouse. However, the operator may prefer to use a joystick. The operator could then select the control object set for the joystick by, for example, clicking on a screen icon (the device model 676). As noted below, the operator could also select desired operating characteristics for the joystick, such as sensitivity, speed, etc., and store these settings for later call up.

User programs interact with the magnetically levitated I/O device through application bindings which relate user variables to specific actions. The user program 672 contains code representing key quantities that are of interest to the user. In a flight simulator program, for example, the user wants to feel the same tactile sensations in a joystick that he would feel under actual operating conditions, such as engine vibration, resistance which varies as a function of the forces on the aircraft control surfaces, turbulence effects, and the like. The application bindings 674 are the code instructions for modifying the action of the maglev device.

The user can select which of many synthetic device models to use for his application. The device models are idealized entities which are either pre-contrived and stored in a library, or can be created. Each device model could contain a "demo mode" which would include suitable screen graphics to enable the user to understand its use. The operator or user program selected device model directs the application binding instructions to the appropriate controller object set (the joystick, in the case of the flight simulator program). The operative controller object set 666 then modifies the active control algorithm 664 to control the realtime I/O 662 and thus the current flow to the maglev forcer elements 150.

The tactile editor 678 functions analogously to the text editor in a word processing program. The tactile editor allows the operator to force changes to the application bindings. The tactile editor is a high level program which permits the user to customize and tune models or build more complicated models from a simple basis set. For example, the user could select a "joystick", and while feeling around with it using his right hand, he could adjust its axes, spring restoring forces, damping, friction, etc. by typing on the system keyboard with his left hand and watching a graphical representation of the values. When the joystick felt "right" the model would be instantiated and stored. The user could also create his personal set of "tactile icons" somewhat analogous to screen "visual icons".

SYSTEM OPERATION

In the presently preferred embodiment, the invention operates by means of a coupled six degree-of-freedom digital servo operating at a loop rate of around 1 KHz or faster. The following steps must be carried out at least at 1 msec intervals:

1. The flotor position and orientation is measured and are used for control of the maglev devices and are sent to the application program for use as inputs.

2. The position and orientation is compared with a reference position and orientation which is controlled by host application software.

3. The position and orientation error is calculated.

4. A total force/torque vector is determined according to the required stiffnesses which are set by the host application.

5. Coil currents are output to create the computed force/torque on the flotor and hence to the user's hand.

Both the position and orientation references and the required stiffnesses are set at a much slower rate in an asynchronous manner by the host application software through special interface routines. These interface routines, in effect, create the desired behavior, and can be thought of as emulating real mechanical devices.

An important principle is that of kinesthetic correspondence between what is viewed on the display screen and how it is manipulated using the fingers or hand. It has been shown that greater user productivity occurs when the correspondence is close. This is more readily achieved in this I/O device since the mechanical properties can be programmed by the user.

Examples of the manner in which the system can be implemented are described below.

Synthetic Input Devices

A number of useful user interaction devices can be emulated or synthesized by the invention. The following is a list of some devices which function primarily as input devices (that is, information mostly flows from the user's hand to the computer, with some information flowing in the opposite direction).

1. Tablet Emulation

The controller gains can be set by the host computer to make the maglev I/O device emulate a planar slider. In order to prevent the flotor from sliding to the end of its workspace when the user does not hold it, one can either use a light spring action to keep the flotor at the center of the sliding plane, or else simulate some static friction. The slider can be moved about in the horizontal plane, while the host computer interprets its position in an X-Y coordinate space, as if it were generated by a tablet. The X-Y position would, for example, control the position of a pointer on the screen. If the flotor nears the mechanical limits of its motion range, a simulated restoring force can be introduced, in effect creating software limit stops. Other tactile indicators could be provided when the screen pointer reaches the edges of windows. For example, the user could experience a slight vertical bump whenever the pointer crossed a window boundary, giving the user an important cue.

2. Multi-Plane Tablet

The slider emulating a digitizing tablet in (1) above can have multiple planes. By pressing or lifting harder in the Z direction, the user can shift from one plane to another, with a corresponding change in the display. For example, the user could "pop" through a series of overlapping screen windows, while feeling a "detent" position for each plane. An example of a working algorithm for implementing a two-plane XY-tablet device is described below.

```
procedure pushpop
    set X stiffness = 0;
    set Y stiffness = 0;
    set all other stiffnesses = maximum;
        set Zsp = Z0;
    set all other translational and rotational
    offsets = 0;
    plane0: do forever
        if (Z − Z0) limit, set Zsp = Z1, goto
        plane1
    end loop plane0;
    plane1: do forever
        if (Z1 − Z) > limit, set Zsp − Z0, goto
        plane0
    end loop plane1;
end pushpop;
```

The algorithm works as follows. In the initial block, the maglev device is set to emulate an XY I/O device. This is done by initially setting all six stiffnesses (coefficients in gain matrix).

In the second block, the Z servo position set point Zsp is set to the value Z0 corresponding to the height of one of the two planes. All other positions and angles are set to zero. The user may readily move the device in the XY plane with negligible hand pressure, but will feel strong resistance to torsional efforts or to pushing (toward $-Z$) or pulling (toward $+Z$).

In the third block, the difference between the Z position and the preset position Z0 of the maglev device is continually compared. If the difference exceeds a preset limit (because of downward forces from the user's hand) the Z set point is changed to a lower value Z1, causing the maglev device to suddenly jump downward to the new height.

In the fourth block, the difference between the Z position and the new set point Z1 of the maglev device is continually compared. If the difference exceeds a preset limit (because of upward forces from the user's hand) the Z set point is changed to a higher value Z0, causing the maglev device to suddenly jump back upward to the new height.

Thus, while freely moving in the XY plane (the X and Y positions of the maglev I/O device serve as inputs to the computer) the user may "pop" and "push" up and down, experiencing vertical forces associated with the two planes Z0 and Z1. The transitions between Z0 and Z1 can be associated with moving a cursor between two overlapping windows on the computer screen, for example.

The absolute orientation of the XY plane in this example can be parallel to the workstation table top or parallel to the screen, or in any other orientation selected by the user by executing another simple program prior to entering the program listed above. Moreover, the program listed above is readily generalized to an arbitrary number of planes.

3. Tree Traverser

The I/O device could be programmed as in (1), but with multiple detents (like potential wells) corresponding to the branches of a tree. When a detent is entered, the user presses slightly, "popping through" as in (2) to the next level of the tree, whereupon a new set of detents is experienced, etc. Thus, for example, the user could rapidly move through a hierarchical file system visualized as a three-dimensional tree.

4. Joystick Emulation

The controller gains can be set by the host computer to make the I/O device emulate a gimbal with some restoring force and/or friction. This is accomplished by making the flotor's stiffness high, except for two rotation axes (the X and Y axes, for example, just like in an ordinary joystick). The two gimbal angles can be interpreted as a position or desired motion rate in an X-Y coordinate space. A joystick with multiple centers of rotation can also be synthesized in a manner analogous to the multi-plane tablet.

5. Object Manipulation in 3-D Space

The I/O device's flotor can be programmed to "hover" in such a way that, when the user displaces or rotates it, a "comfortable" restoring force and/or friction are felt. The graphical display can show a 3-D object and the user, by moving the flotor, can control the position and orientation of the object (position control) or its velocity and angular velocity (rate control), in effect making it "fly around". The switch between rate control and position control can be user-controlled or done automatically by the host system software. For example, appropriate control algorithms can switch between position control for small motions and rate control for large motions. This can be done in a "seamless" manner by enabling/disabling a software integrator. cl 6. Writing Without a Pen The I/O device's flotor can be programmed to have a light weight and no restoring forces until it is lowered so that a virtual pen tip is in contact with a virtual piece of paper. Upon contact, appropriate forces and torques would be felt in the user's hand. Writing motion can then be input to the computer while appropriate software generates a synthetic left-to-right motion for each line of input. Also, individual handwritten characters (for example, Arabic, Chinese, Hebrew or Japanese characters) could be written for some applications.

7. Motion-to-Text Conversion

Motion input by the user's hand could be encoded to text by a simple scheme. For example, consider a $3 \times 3 \times 3$ cube of locations which maps into the 26 letters of the alphabet (plus null position). This could be useful for keyboardless applications or for handicapped users.

SYNTHETIC OUTPUT DEVICES

The following is a list of some devices which function primarily as output devices (that is, information mostly flows from the computer to the user's hand, with some information flowing in the opposite direction).

1. Text-to-Motion conversion (See Motion-to-Text Conversion, above.) A string of text could easily be expressed as a hand motion which could be felt and interpreted by a handicapped individual, after sufficient training.

2. Buzzer

Signals corresponding to "beeps" could briefly vibrate the I/O device's flotor, giving an inaudible non-nonvisual cue to the user. This avoids annoying computer "beeps", especially in a room full of workstations. On the other hand, higher frequency, higher amplitude signals could be fed to the flotor to operate it as a loudspeaker, if desired.

SYNTHETIC INPUT/OUTPUT DEVICES

The following is a list of some devices with highly mixed input and output function (that is, high realtime interaction between the computer application program and the user).

1. Terrain Mapper

The flotor could be programmed as an X-Y slider input device as discussed above, but the Z-motion could be commanded from the application program to allow manual exploration of computed surfaces.

2. Force-Reflecting Teleoperaton

Multi-dimensional synthetic screen objects could be manually controlled (see Object Manipulation in 3D Space, above) while contact forces and torques could be experienced by the user. Either hard contact, such as that encountered during peg-in-hole insertion, or "action at a distance", such as in molecular docking, could be emulated.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

We claim:

1. A programmable computer user input/output (I/O) system, comprising:
   a multiple degree-of-freedom magnetic levitation (maglev) device having a matched electrodynamically levitated flotor and stator combination and an electrodynamic forcer means for receiving coil currents for applying controlled magnetic forces mutual to the flotor and stator and sensing means for measuring the relative position and orientation of the flotor and stator;
   a maglev I/O device control software module for measuring the relative movement of the flotor-stator combination of the maglev device and for controlling the coil currents provided to the electrodynamic forcer means;
   at least one active device model module, comprising a software representation of a mechanical I/O device, for controlling said maglev I/O device control software module to generate signals which emulate the mechanical I/O device represented by said active device model;
   an application software module containing code instructions representing predetermined information relevant to that application and understandable to the user of said application software; and
   an application binding software module interposed and operatively coupled between said maglev I/O device control software module and said application software module for controlling at least one of
   a) said application software module as a function of said measured relative movement of the flotor-stator combination, and
   b) said maglev I/O device control software module as a function of said predetermined application software information.

2. A programmable computer user interface system according to claim 1, further comprising a tactile editor software module, comprising a software interface cooperating with said at least one active device model module, for modifying said active device model as a function of user input parameters to thereby modify the emulation of the mechanical user interface device represented by said active device model.

3. A programmable computer user interface system according to claim 1, further comprising maglev device control means operatively associated with said I/O device control software module; wherein:
   said maglev I/O device control software module includes software instructions for comparing the sensed movements with stored data representing desired parameters of said at least one device model and providing an error signal representing the difference between said stored data and said sensed movements; and
   said maglev device control means further includes means operated on by said maglev I/O device control software module and coupled to said electrodynamic forcer means for providing said coil currents to said electrodynamic forcer means as a function of said error signal.

4. A motion and compliance emulation system, comprising:
   a matched electrodynamically levitated flotor and stator combination, having clearance gaps between flotor and stator sufficient for a desired range of relative motion and greater than required for electrodynamic efficiency;
   electrodynamic forcer means for receiving coil currents for applying controlled magnetic forces mutual to the flotor and stator and analogous to a number of synthetic springs, each synthetic spring having a zero-point and a stiffness value; and p1 programmable means for controlling both zero-point and stiffness value by controlling the coil currents in sets applied to said forcer elements during the entire range of mutual motion, thereby controlling position, orientation and compliance, said programmable means including:
   a maglev I/O device control software module for controlling the amplitude of the coil currents provided to the electrodynamic forcer means;
   at least one active device model module, comprising a software representation of a mechanical I/O device, for controlling said maglev I/O device control software module to generate signals which emulate the mechanical I/O device represented by said active device model;
   an application software module containing code instructions representing predetermined information relevant to that application and understandable to the user of said application software; and
   an application binding software module interposed and operatively coupled between said maglev I/O device control software module and said application software module for controlling said maglev I/O device control software module as a function of said predetermined application software information.

5. A motion and compliance emulation system according to claim 4, further comprising a tactile editor software module, comprising a software interface cooperating with said at least one active device model module, for modifying said active device model as a function of user input parameters to thereby modify the emulation of the mechanical user interface device represented by said active device model.

6. A motion and compliance emulation system, comprising:
- a matched electrodynamically levitated flotor and stator combination, having clearance gaps between flotor and stator sufficient for a desired range of relative motion and greater than required for electrodynamic efficiency;
- sensing means for generating output signals as a function of the relative movement of the flotor-stator combination of the maglev device;
- a maglev I/O device control software module for comparing said output signals with stored data representing desired parameters of said at least one device model and providing an error signal representing the difference between said stored data and said sensing means output signals;
- at least one active device model module, comprising a software representation of a mechanical I/O device, operatively coupled with said maglev I/O device control software module for generating emulation signals as a function of said error signal which emulate the mechanical I/O device represented by said active device model;
- an application software module containing code instructions representing predetermined information relevant to that application and understandable to the user of said application software; and
- an application binding software module interposed and operatively coupled between said maglev I/O device control software module and said application software module for controlling said application software module as a function of said sensing means output signals.

7. A motion and compliance emulation system according to claim 6, further comprising a tactile editor software module, comprising a software interface cooperating with said at least one active device model module, for modifying said active device model as a function of user input parameters to thereby modify the emulation of the mechanical user interface device represented by said active device model.

8. A programmable computer user input/output (I/O) system, comprising:
- a multiple degree-of-freedom magnetic levitation (maglev) device having a levitated flotor and stator combination and force applying means for receiving coil currents for applying controlled magnetic forces mutual to the flotor and stator;
- a maglev I/O device control software module for measuring the relative movement of the flotor-stator combination of the maglev device and for controlling the coil currents provided to the force applying means;
- at least one active device model module, comprising a software representation of a mechanical I/O device, for controlling said maglev I/O device control software module to generate signals which emulate the mechanical I/O device represented by said active device model;
- an application software module containing code instructions representing predetermined information relevant to that application and understandable to the user of said application software; and
- an application binding software module interposed and operatively coupled between said maglev I/O device control software module and said application software module for controlling at least one of
  a) said application software module as a function of said measured relative movement of the flotor-stator combination, and
  b) said maglev I/O device control software module as a function of said predetermined application software information.

9. A programmable computer user interface system according to claim 8, further comprising a tactile editor software module, comprising a software interface cooperating with said at least one active device model module, for modifying said active device model as a function of user input parameters to thereby modify the emulation of the mechanical user interface device represented by said active device model.

10. A programmable computer user interface system according to claim 8, further comprising maglev device control means operatively associated with said I/O device control software module; wherein:
- said maglev device control means includes sensing means for sensing the relative movement between said flotor and stator;
- said maglev I/O device control software module includes software instructions for comparing the sensed movements with stored data representing desired parameters of said at least one device model and providing an error signal representing the difference between said stored data and said sensed movements; and
- said maglev device control means further includes means operated on by said maglev I/O device control software module and coupled to said electrodynamic forcer means for providing said coil currents to said force applying means as a function of said error signal.

* * * * *